May 28, 1929.  B. J. GOLDSMITH ET AL  1,714,978
WINDOW ASSEMBLY
Original Filed March 26, 1925   2 Sheets-Sheet 1
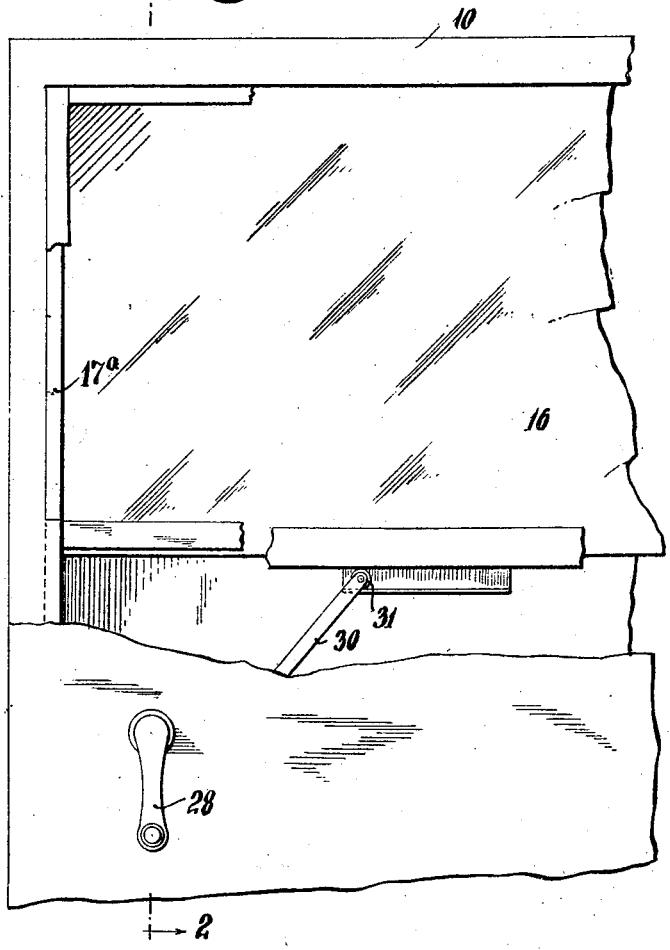
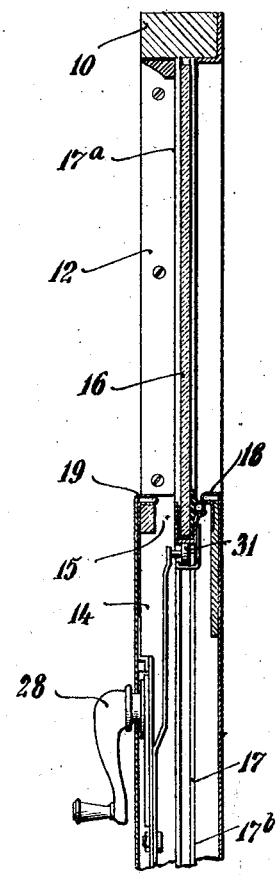
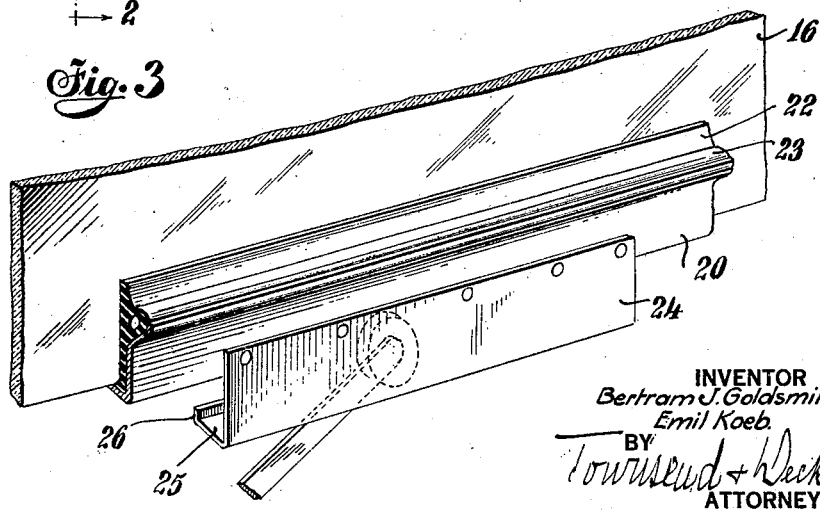
INVENTOR
Bertram J. Goldsmith.
Emil Koeb.
BY
Townsend + Decker
ATTORNEYS.

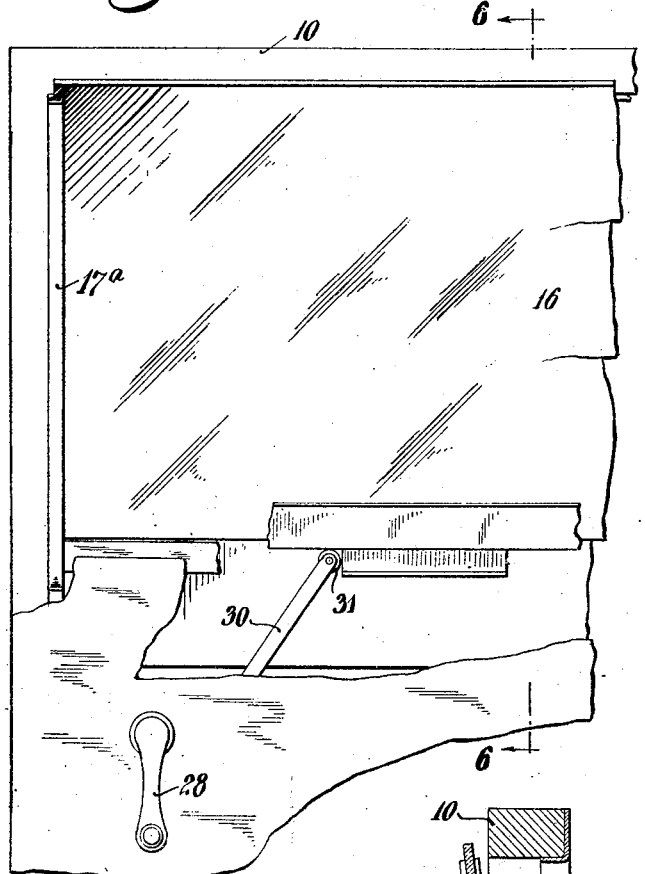
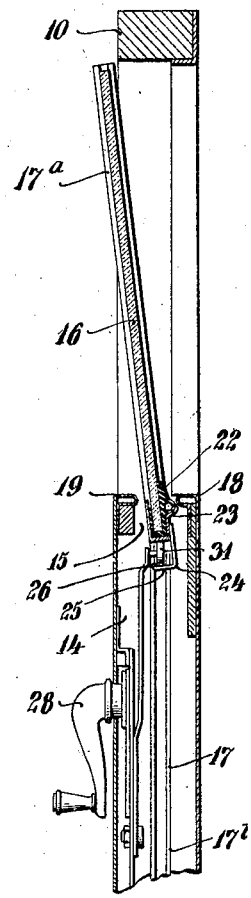
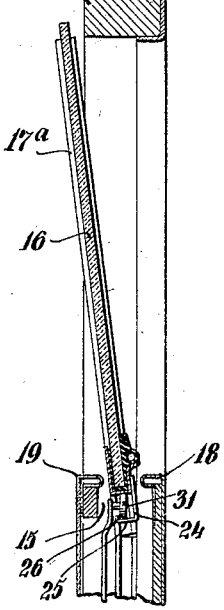

Patented May 28, 1929.

1,714,978

UNITED STATES PATENT OFFICE.

BERTRAM J. GOLDSMITH AND EMIL KOEB, OF LONG ISLAND CITY, NEW YORK, ASSIGNORS, BY MESNE ASSIGNMENTS, TO THE ENGLISH & MERSICK COMPANY, OF NEW HAVEN, CONNECTICUT, A CORPORATION OF CONNECTICUT.

WINDOW ASSEMBLY.

Application filed March 26, 1925, Serial No. 18,630. Renewed October 6, 1928.

This invention relates to window structures and to the method of assembling the same and is particularly adapted for use in closed automobile constructions.

It is a primary object of the invention to provide an efficient window regulator in which the glass can be readily mounted in position on the frame and secured to the window regulator after the frame proper has been completely assembled.

Other and more specific objects will appear from the following description.

Fig. 1 shows a broken side elevational view of a portion of an automobile with my invention applied thereto, the window being in closed position.

Fig. 2 is a section thereof substantially on the line 2—2 of Fig. 1,

Fig. 3 is an enlarged perspective view showing the guide member secured to the edge of the window.

Fig. 4 is a broken elevational view showing showing the method of inserting or removing the window.

Fig. 5 is a sectional view through the same prior to removal of the window.

Fig. 6 is a section on the line 6—6 of Fig. 4.

In the drawings there are shown certain portions 10 of an automobile frame member which may be either a door or a portion of the frame proper thereof or any other supporting framework as the invention is not limited to any particular use. The frame member 10 is formed with a window opening 12 and a window well 14, the opening 15 being provided above the window well 14 so that the window element 16 may be lowered into the window well or moved to position to close the opening 12. The sides of the opening 15 are preferably provided with the window sills 18 and 19 upon the outer and inner sides of the window respectively, the inner sill 19 being spaced a certain distance from the window 16 for a purpose to be hereinafter referred to. The window 16 is guided in its movement with respect to the frame in channel-shaped guides 17. The lower sections 17$^b$ of these guides may be permanently mounted on the side sills of the frame but the upper sections 17$^a$ are designed to be angularly displaced as shown for example in Fig. 5, as will appear more fully hereinafter.

The channelled cross member 20 is clamped upon the lower edge of the window element 16 and preferably extends across the entire length thereof. It is considered desirable to provide rubber or other shock absorbing packing material 22 between the window and channel member for the purpose of protecting the window and preventing any noise during the use or operation thereof. The sealing strip 22 may have a flange or bead 23 thereon to engage the outer window sill 18 to form a seal therewith. A downwardly extending plate 24 is secured upon the cross member 20 and extends downwardly a short distance, then transversely to provide the track member 25 and thence upwardly to form the retaining flange 26.

The window regulator indicated generally at 28 includes a pivotally mounted arm 30 carrying at the outer or free end thereof an operating roller 31 operating between the track 25 and the bottom of the cross member 20. The track portion 25 and flange 26 terminate short of the side edge of the window 16 and are preferably so arranged that the roller 31 approaches close to one end of the track when the window is in raised position, as shown in Fig. 1. The window regulator 28 may be of any preferred form, it being understood that, upon rotation of the operating handle thereof, the arm 30 is swung about its pivot so as to move the roller 31 in the arc of a circle and thereby control the movements of the window 16.

The description of the assembling and operation of the window constructed according to our invention follows:—

During the construction of the frame member 10 the lower portion 17$^b$ of the guiding channels is secured in position but the upper sections 17$^a$ are left free to be moved to the position shown in Fig. 5. The window 16 is inserted into the displaced upper sections of the channels 17 to the position shown in Figs. 4 and 6, with the roller 31 in position to be moved into its guiding track 20, 25. Upon rotation of the window regulator handle to move the arm 30 to the right as viewed in Fig. 4, the roller is caused to move into its position above the track member 25, the window thereby being moved to position shown in Fig. 5. The channel sections 17$^a$ are then moved into vertical alignment with the sections 17$^b$ thereof in which position they are secured by the usual molding strips or otherwise. The window is then completely assembled and ready for use. It is to be noted that the window sill 19 being substantially spaced from the window 16, in no way interferes with the inward movement of the window or channels during installation or removal of the window.

Having now described our invention we desire it to be understood that the construction shown is merely illustrative and that the invention disclosed is limited only as set forth in the appended claims.

We claim as our invention:—

1. In combination with a vertically movable window adapted to be supported by a frame part, means for controlling the movements thereof, said means including a cross member engaged with said window and including a track having an open end and a pivoted operating element having means for engagement with said track, the end of said track terminating in said open end being spaced from the side edge of said window, said operating element being constructed to be rotatable beyond the position normally occupied thereby when said window is in raised position to permit said engagement means to be withdrawn from the open end of said track by an abnormal movement thereof.

2. In combination with a supporting frame provided with a window opening, a slidable window movable in normal operation to or from position to obstruct said window opening, a window regulator, means for connecting said regulator with said window, said means including a transverse guide member carried by the window and an element carried by said regulator and having vertical and lateral movement and normally associated with said guide member, said element being movable vertically to a point beyond that occupied thereby when the window is in an extreme normal position, said guide member terminating near the point thereof engaged by said element when the window is in such extreme normal position to permit the disassociation of said element from said guide member on moving said window to an abnormal position.

Signed at New York in the county of New York and State of New York this 25th day of March, A. D. 1925.

EMIL KOEB.
BERTRAM J. GOLDSMITH.